United States Patent
Dhingra

(10) Patent No.: US 12,361,109 B1
(45) Date of Patent: Jul. 15, 2025

(54) AUTHENTICATION WITH DYNAMIC USER IDENTIFICATION

(71) Applicant: U.S. Bank National Association, Minneapolis, MN (US)

(72) Inventor: Ashoo Dhingra, Naperville, IL (US)

(73) Assignee: U.S. Bank National Association

( * ) Notice: Subject to any disclaimer, the term of this patent is extended or adjusted under 35 U.S.C. 154(b) by 0 days.

(21) Appl. No.: 19/097,965

(22) Filed: Apr. 2, 2025

(51) Int. Cl.
*G06F 21/00* (2013.01)
*G06F 21/32* (2013.01)
*G06F 21/46* (2013.01)

(52) U.S. Cl.
CPC .............. *G06F 21/32* (2013.01); *G06F 21/46* (2013.01)

(58) Field of Classification Search
CPC ................................. G06F 21/32; G06F 21/46
See application file for complete search history.

(56) References Cited

U.S. PATENT DOCUMENTS

| | | | |
|---|---|---|---|
| 9,100,392 B2 | 8/2015 | Hubner et al. | |
| 9,953,149 B2 | 4/2018 | Tussy | |
| 10,574,650 B2 | 2/2020 | Wallace et al. | |
| 10,685,250 B2 | 6/2020 | Brown | |
| 10,885,410 B1 | 1/2021 | Rule et al. | |
| 12,020,512 B2 | 6/2024 | Vemulapalli et al. | |
| 12,039,024 B2 | 7/2024 | Wasnik et al. | |
| 2013/0227661 A1* | 8/2013 | Gupta | H04L 9/321 726/6 |
| 2016/0080366 A1* | 3/2016 | Agarwal | H04L 63/0838 726/6 |
| 2022/0294778 A1 | 9/2022 | Li et al. | |
| 2022/0345454 A1* | 10/2022 | McGrandle | H04L 63/0861 |

OTHER PUBLICATIONS

Jayandhi et al. Secure Pin Authentication as a Service for ATM, International Journal of Advanced Research in Electrical, Electronics and Instrumentation Engineering, vol. 7, Issue 3, Mar. 2018, https://www.ijareeie.com/upload/2018/march/39_Secure.pdf.

(Continued)

*Primary Examiner* — William A Corum, Jr.
(74) *Attorney, Agent, or Firm* — Garg Law Firm, PLLC; Rakesh Garg; Chris Ziolkowski

(57) ABSTRACT

An embodiment includes receiving, from a device, at an authentication service, a dynamic user identifier having a one-time password in an authentication message constructed to carry the dynamic user identifier in place of a predetermined user identifier of a user. The embodiment locates in a profiles database, using a customized search query with a code based on the dynamic user identifier, a user profile. The embodiment receives at the authentication service, a secondary identification data of the user including a biometric information of the user. The embodiment validates the biometric information using the user profile and enables, when the validating is successful, the device to perform an operation. The enabling is not based on the authentication service validating an entirely static user identifier and is not based on the authentication service validating a manually typed password.

19 Claims, 12 Drawing Sheets

(56) References Cited

OTHER PUBLICATIONS

Velayuthapandian et al., End-to-End CNN conceptual model for a biometric authentication mechanism for ATM machines, Discover Electronics 1, No. 1: 26, Nov. 21, 2024, https://link.springer.com/content/pdf/10.1007/s44291-024-00034-x.pdf.

Boraiah, Secure Cardless Transaction Android Application using ECC algorithm and QR code, National College of Ireland, 2019, https://norma.ncirl.ie/4170/1/sumanaponnasamudraboraiah.pdf.

Omolara et al., Fingereye: improvising security and optimizing ATM transaction time based on iris-scan authentication, International Journal of Electrical & Computer Engineering (2088-8708) 9, No. 3, Jun. 2019, t: https://www.researchgate.net/publication/333538332.

Muley et al., Prospective solution to bank card system using fingerprint, 2nd International Conference on Inventive Systems and Control (ICISC), pp. 898-902, Jan. 19, 2018, https://www.researchgate.net/profile/Abhinav-Muley/publication/326079589_Prospective_solution_to_bank_card_system_using_fingerprint/links/5b4ee8bb0f7e9b240fe9132c/Prospectivesolution-to-bank-card-system-using-fingerprint.pdf.

* cited by examiner

AUTHENTICATION WITH DYNAMIC USER IDENTIFICATION

BACKGROUND

User identifier and password-based authentication is a common security mechanism used to verify the identity of a user attempting to access a system, application, or service. This method involves two key components:

(i) User identifier (also referred to as a username or simply UID), which is a unique identifier assigned to a user. A UID is traditionally an email address, a name, a number, or any other unique string of characters that distinguishes one user from another within the system. The UID is typically chosen by the user or assigned by a system administrator. Traditional UIDs are fixed.

(ii) Password, which is a string of characters that are used in conjunction with the UID to verify the user's identity. Traditionally, passwords are supposed to be secret and set by and known only to the user. A password is received, stored, or used by an authentication system in either an encoded form or in a plaintext form depending on the configuration of the authentication system. Password Complexity is a consideration in security of the systems using UID-password based authentication. Users are often required to create strong passwords that include a mix of letters, numbers, and special characters to make them harder to guess or crack. Systems may enforce policies such as minimum password length, expiration periods, and restrictions on reusing old passwords.

Some authentication regimes require the UID and password to be entered and provided together in a single step, and some require the user to provide the UID first, followed by the password in a multistep process. In a typical authentication process, a user enters their UID and password into a login interface of a system or application. The entered credentials are transmitted to an authentication server. This transmission can be, and usually is, encrypted to protect the credentials from being intercepted by malicious actors. The authentication server performs a verification operation by comparing the provided UID and password against the stored credentials in its database. The password is typically stored in a hashed and salted format to enhance security.

Successful Authentication: If the provided credentials match the stored credentials, the user is granted access to the system or application. Failed Authentication: If the credentials do not match, the user is denied access, and an error message is typically displayed, prompting the user to try again.

UID and password-based authentication is widely used due to the simplicity of the process and the familiarity of the users with the authentication method. However, many authentication systems implement additional security measures to mitigate potential vulnerabilities in UID-password based authentication systems. Multi-Factor Authentication (MFA) is one such measure to enhance security. A system may implement MFA by requiring users to provide additional verification, for example a code sent to their mobile device, or a code generated by an authenticator application in addition to their UID and password.

MFA authentication methods include one-time passcode (OTP) based systems. Two prominent types of OTP-based authentication are HMAC-based One-Time Password (HOTP) and Time-based One-Time Password (TOTP). HMAC stands for Hash-based Message Authentication Code. These methods generate a unique, temporary passcode for each authentication attempt, significantly enhancing security by reducing the risk of unauthorized access.

HOTP and TOTP are both derived from a shared secret key and an algorithm that generates a passcode. HOTP typically relies on a counter that increments with each authentication attempt, ensuring that each passcode is used only once. In contrast, TOTP generates passcodes based on the current time, typically in 30-second intervals, making it time-sensitive. Both methods are widely adopted in two-factor authentication (2FA) systems, providing an additional layer of security beyond traditional passwords.

Despite their effectiveness, there are ongoing efforts to improve the usability and security of OTP-based authentication systems to address emerging threats and enhance user experience.

SUMMARY

The present disclosure includes inventive concepts relating generally to user authentication, such as methods, systems, and computer programs for authentication with dynamic UID. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method includes receiving, from a device, at an authentication service, a dynamic user identifier comprising a one-time password in an authentication message constructed to carry the dynamic user identifier in place of a pre-determined user identifier of a user. The computer-implemented method also includes locating in a profiles database, using a customized search query with a code based on the dynamic user identifier, a user profile. The computer-implemented method also includes receiving at the authentication service, a secondary identification data of the user, wherein the secondary identification data comprises a biometric information captured from the user. The computer-implemented method also includes validating the biometric information using the user profile. The computer-implemented method also includes enabling, responsive to the validating of the biometric information being successful, the device to perform an operation for the user, wherein the enabling is not based on the authentication service validating an entirely static user identifier and is not based on the authentication service validating a manually typed password.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

At least some novel features believed characteristic of examples of inventive concepts disclosed herein are set forth in the appended claims. The inventive concepts of the instant application, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
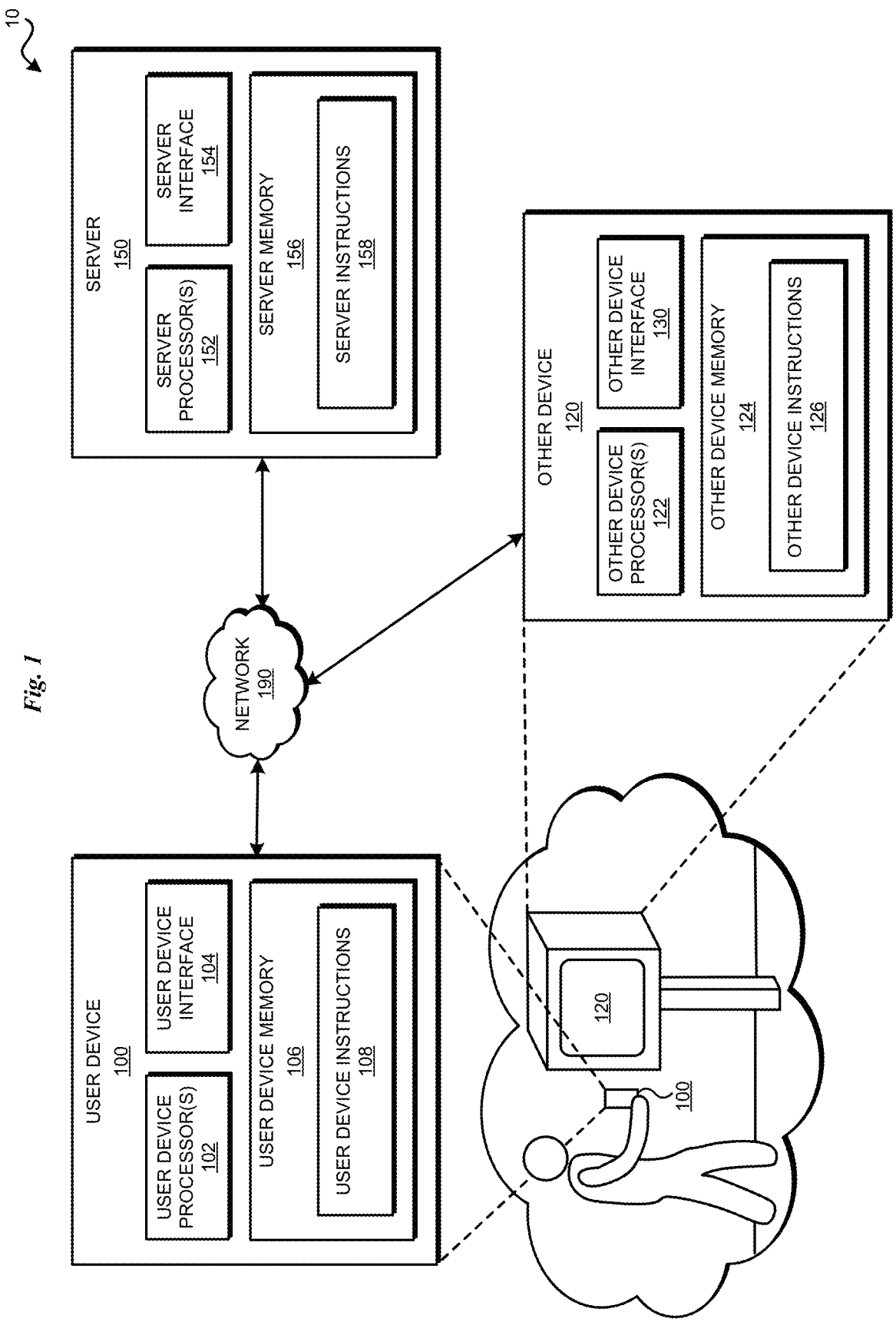
FIG. 1 depicts a block diagram of a computing environment in which an illustrative embodiment may be implemented.

For the clarity of the description, a nonlimiting example use case of a banking system environment is presented in which a user conducts financial transactions of various types, using various systems, applications, and devices. The present disclosure relates to an authentication system designed to enhance security and user convenience in the data processing environment. Traditional authentication methods in the data processing environments of financial institutions and other service providers typically involve validating a user's credentials such as a user identifier (UID) and password to establish identity and grant access. These methods are commonly used for accessing the computer systems, Automated Teller Machine (ATM) machines and other terminal devices, and secure facilities at brick-and-mortar locations such as deposit boxes and vaults. In particular, the use of debit or credit cards where the card number serves as a static or pre-assigned UID and the Personal Identification Number (PIN) or Card Verification Value (CVV) code acts as a password is prevalent.

Recent advancements in authentication techniques have introduced MFA, which adds a dynamic token component to the traditional static UID and password combination. Various mechanisms such as OTP, TOTP, and HOTP have been deployed to enhance security. However, while MFA offers improved security, it can be cumbersome for users at ATMs or Point of Sale (POS) terminals. Additionally, users must still remember or produce static or pre-assigned portions of the credentials, such as the UID. Physical cards remain susceptible to loss and skimming.

In response to these challenges, the illustrative embodiment provides a novel authentication approach that leverages a dynamic manner of UID generation in conjunction with biometric authentication. One embodiment according to this approach introduces a dynamic UID (DID), such as may be generated at least in part through a time-based token. In some examples, the time-based token is combined with a static component (e.g., an encrypted static identifier associated with the user). Facial recognition or other biometrics can be used as a password. The dynamic UID can be achieved by generating a TOTP token, which is treated as the UID. The "P" in "TOTP" stands for "password" because it is traditionally used as a password—not a user identifier. So, when used as part of a dynamic UID, TOTP may more accurately be referred to as a Time-Based One-Time ID (TOTID) or Time-Based One-Time Code (TOTC). However, for ease of understanding of those skilled in the art, the initialism "TOTP" will be used.

Once the prospective identity of the user is established by matching the TOTP token to their master record, authentication proceeds by matching the user's facial scan to a saved facial record from the time of enrollment or a previous login. An additional embodiment performs a liveliness check to ensure that a live person is present for authentication, preventing the use of previously saved images, and other two-dimensional or three-dimensional facsimiles of a human.

Another illustrative embodiment further integrates the Dynamic UID (DID) system into the mobile application of the financial institution or the service provider, providing an additional layer of security. Users must first log into the provider's mobile application (app) using an authentication system for the app (e.g., using a traditional authentication system or by providing biometrics to gain access, such as using FACE ID by APPLE) to receive or generate their DID. TOTP-based dynamic UID is one nonlimiting example of the DID. Other types of OTP can similarly be used as a DID within the scope of the illustrative embodiments.

The example time-based DID serves as a valid short-term identifier, allowing the authentication system to identify the user record. Once the user record is located, further authentication is performed using biometric data, such as a face id and liveliness checks.

A still further illustrative embodiment involves the use of a DID that has both a static component and a dynamic component. The static component can be a fixed set of characters that does not change across the DIDs of a given user. The dynamic component is a dynamic set of characters that does change as the DIDs of a given user are generated. Beneficially, the use of a static component in the DID can allow for faster lookup of the user record.

In one example embodiment, an enrollment process for this system involves logging onto the service provider's system using an existing authentication, requesting enrollment, and performing a biometric scan (e.g., a facial scan, a retinal scan, a fingerprint scan, or other biometric scan with or without a liveliness check). The biometric record is then saved for one or more future authentications.

When using this authentication system to access secure facilities such as ATMs, POS, terminal machines, safe deposit boxes, and facility access points of these and other types, users log into the service provider's app, access a screen that provides access to a TOTP generator, and use the DID—which includes a generated code (e.g., a numeric or alphanumeric code)—or a corresponding Quick Response (QR) code at the facility access point. Once the DID (e.g., a TOTP token thereof) is matched against a valid user record, biometric scan instructions are provided. The facility's biometric sensor, such as an inbuilt camera or other sensor, captures biometric data, such as a new face image with a liveliness check, which is sent to the server for a match. Access is granted once the biometric data capture matches the saved biometric record.

The illustrative embodiments offer potential applications beyond securely accessing a wide variety of terminal devices and physical facilities. An illustrative embodiment can be used generally to authenticate a user for any type of online access, app-based access, device security, access control to physical or virtual resources, authorization processes-such as to serve as identity verification for a financial transaction or guarantee. By integrating biometric validation with DID, the novel aspects of the illustrative embodiments enhance data security and may reduce or eliminate the need for issuing physical cards for ATM debit and credit use cases.

The illustrative embodiments recognize that one significant issue with the two-part UID-and-password authentication system is its susceptibility to credential theft. Static UIDs, often based on easily guessable information such as email addresses or usernames, can be readily obtained through social engineering or data breaches. Once the UID is compromised, malicious actors can employ various methods, such as phishing or brute force attacks, to acquire the corresponding password. The reliance on passwords, which are frequently weak or reused across multiple accounts, further exacerbates the risk of unauthorized access.

A more robust, but still vulnerable, three-part authentication system of "UID, password, and an OTP" has been adopted, incorporating a static or pre-assigned UID, a changeable password, and an OTP. The OTP element still fails to address the problem that exists with credential theft with the two other components, namely the static UID, the password, or both. Adding the OTP does nothing to prevent the compromise of those credentials. With the possibility of interception, theft, or social engineering of the OTP, malicious actors still compromise the user authentication process.

Moreover, the currently available two-part and three-part authentication systems often struggle with user convenience and accessibility. The requirement for users to remember and manage multiple credentials or carry additional devices can be burdensome, leading to poor user experience and reduced adoption. Users may resort to insecure practices, such as writing down passwords or opting out of multi-factor authentication, thereby undermining the intended security benefits.

In light of these challenges, there is a pressing need for innovative authentication solutions that enhance security without compromising user experience. The illustrative embodiments can be used to effectively mitigate the risks associated with credential theft, OTP interception, and user inconvenience, thereby providing a more secure and user-friendly authentication process.

The present disclosure addresses these deficiencies by providing a process for authentication with user identifiers having a dynamic component. Aspects of the illustrative embodiments improve the existing technology for user authentication by implementing a dynamic UID component. Because the proposed embodiments use a dynamic UID and a biometric aspect of the human user in place of a memorized password, the authentication process becomes far more transparent, user friendly, and secure than either the presently used two-part "static UID and changeable password" system, or the three part "entirely static UID, changeable password, and an OTP" system. Removal of the entirely static components create a high deterrence factor in unauthorized access attempts because there is no component of the user credential in the illustrative embodiments that can be discovered once and stored for later unauthorized use. Removal of the memory-dependent password component and using in its place a biometric aspect of the user as a secondary identification data of the user, which requires no memorization and cannot be separated from the user, enhances the usability, user-friendliness, and difficulty level for a compromise in the improved authentication process of the illustrative embodiments.

A DID as referred to herein is data that includes an aspect that is changeably generated on demand and has associated therewith a period of validity that is on the order of seconds or minutes. The period of validity can be significantly shorter than the time taken by a financial transaction. As an example, the period of validity is a few seconds, usually ranging from 15 seconds to about 3 minutes, whereas an online session might last significantly longer than that period. TOTP is one non-limiting example of the DID. HOTP with a time component, or any other changeable data with a short period of validity can similarly be used to identify the user within the scope of the illustrative embodiments.

Biometric data as referred to herein is described using a non-limiting example of a visual image of one or more facial features of a user. Other types of biometric data obtainable from a specific user and sufficient to uniquely identify the specific user (referred to herein as other ID) include a retinal image, a fingerprint, a thermal image of blood vessels, a temperature profile of the user over a period, a breathing profile of the user over a period, a speech pattern of the user, a gait of the user over a period, or any other biological, physiological, or physical data of the user suitable for this purpose. Such other ID variants are contemplated within the scope of the biometric data as used in the illustrative embodiments.

Embodiments disclosed herein are sometimes described with respect to a financial service provider use-case as an example, however, the use of this example is not intended to be limiting, but is instead used for clarity and descriptive purposes only. Instead, the applicability of an embodiment can be in any configuration where user authentication may be employed.

The following description provides examples of embodiments of the present disclosure, and variations and substitutions may be made in other embodiments. Several examples will now be provided to further clarify various aspects of the present disclosure.

Example 1: An embodiment involves receiving a DID comprising an OTP from a device at an authentication service. The OTP acts as a DID or as part of a DID in an authentication message, replacing a pre-determined UID. The embodiment includes locating a user profile in a profiles database using a customized search query with a code based on or corresponding to the DID or a portion thereof (e.g., a static component of the DID). The authentication service receives secondary identification data of the user, which includes biometric information captured from the user. The embodiment validates the biometric information using the user profile and enables the device to perform an operation for the user if the validation is successful. This embodiment enhances security by using dynamic identifiers and biometric validation, providing a robust mechanism to protect user data and access. In this example, the enabling is not based on the authentication service validating an entirely static user identifier and is not based on the authentication service validating a manually typed password.

Example 2: Another embodiment includes authenticating the user with a device-level authentication credential. The authentication message is received after a successful device-level authentication. This approach provides an additional layer of security by ensuring the device itself is authenticated, thereby reducing the risk of unauthorized device access and enhancing overall system integrity.

Example 3: An additional embodiment involves authenticating the user using an application-level authentication credential. The authentication message is received after a successful application-level authentication. This adds another security layer by verifying the user's access to specific applications, ensuring that only authorized users can access sensitive application data and functionalities.

Example 4: In another embodiment, application-level authentication is performed after successful device-level authentication. This sequential authentication process ensures that both the device and the application are secure before granting access, thereby providing a comprehensive security framework that protects both device and application layers.

Example 5: An embodiment includes generating the OTP by sending an instruction to an OTP generator application in response to a user input at a device's user interface. The OTP is a TOTP. This time limitation enhances security by reducing the window of opportunity for unauthorized use, ensuring that OTPs are valid only for a short duration and minimizing the risk of interception.

Example 6: In another embodiment, the device is a user device associated with the user, and the OTP generator application is accessible from within another application. This integration allows for seamless OTP generation within existing service provider's applications, providing users with a convenient and efficient way, yet a service provider-controlled way to generate OTPs without needing additional software or hardware.

Example 7: An embodiment specifies that the other application is a service provider application, which permits access to the OTP generator application after successful application-level authentication. This ensures that only authenticated users can generate OTPs, enhancing security by preventing unauthorized OTP generation and access.

Example 8: In another embodiment, the device is described as a terminal device of a service provider configured with an interface to receive user input containing the OTP. This setup allows for secure OTP input at service provider locations, ensuring that OTPs are entered in a controlled and secure environment, reducing the risk of interception or misuse.

Example 9: An embodiment includes the OTP in a scannable encoded image, and the interface includes a scanner. The input involves presenting the scannable code at a scanner. This embodiment provides a quick and secure way to input OTPs using scannable codes, enhancing user convenience and reducing the likelihood of input errors.

Example 10: Another embodiment involves transmitting secondary identification data after successful OTP validation with biometric information captured after OTP transmission. This sequence ensures that biometric data is only captured for validated OTPs, enhancing privacy and security by ensuring that biometric data is only collected when necessary.

Example 11: An embodiment includes receiving the OTP and secondary identification data in a single message, which comprises the authentication message. This consolidation simplifies the authentication process by reducing the number of messages exchanged, streamlining communication, and improving system efficiency.

Example 12: In another embodiment, a previous version of biometric information in the user profile is located, captured during a previous session with a service associated with the authentication service. The validation of biometric information uses this previous version. This historical data usage improves the accuracy of biometric validation, providing a more reliable authentication process by leveraging past data.

Example 13: An embodiment includes replacing the previous version of biometric information with the new biometric information. This update ensures that the most current biometric data is used for future validations, enhancing accuracy and ensuring that the system always relies on the latest available data.

Example 14: Another embodiment involves locating marker data in the user profile corresponding to a version of the biometric information. The validation of biometric information uses this marker data. This method enhances the privacy of the validation process by storing and using algorithmically usable marker data points instead of the entire biometric data, providing a more secure and privacy-conscious authentication process.

Example 15: In an embodiment, the dynamic user identifier includes a static portion and a dynamic portion, and the static portion is used to facilitate the locating of the user profile. This method of using a static component in the DID can allow for faster lookup of the user record.

Example 16: An embodiment includes capturing biometric information using a biometric sensor coupled with the device, where the biometric information includes a facial scan of the user. This embodiment provides a convenient and secure way to capture biometric data using commonly available camera-type sensors, ensuring that biometric information is collected accurately and efficiently and with already existing sensors. A liveliness check is performed on the facial scan, and the scan is rejected if it corresponds to a facsimile of the user. This check prevents unauthorized access using fake biometric data, enhancing security by ensuring that only live biometric data is accepted for authentication.

FIG. 1 depicts a block diagram of a computing environment in which an illustrative embodiment may be implemented. The computing environment, labeled and referred to as system 10, includes user device 100, other device 120, and server 170 connected to a network. According to examples described herein, the user may want to gain access to the other device 120 (or an area controlled by the other device 120, such as a secured area) using a DID based in part on functionality of the user's device 100. A server 170 facilitates the authentication of the user with the other device 120. But some implementations may operate without the need for a server.

System 10 is configured to load and execute at least some of the computer code involved in performing the inventive methods, such as server instructions 158, which include the server-side computer program instructions of an embodiment, user device instructions 108, which include the user device-side computer program instructions of an embodiment, and other device instructions 126, which include the other device-side computer program instructions of an embodiment, as may be needed to perform the dynamic adaptation of identity related user interface.

User device 100 is a device used by a user that can be used as part of processes described herein. User device 100 can include one or more aspects described elsewhere herein such as in reference to computing environment 1200 of FIG. 12. In many examples, user device 100 is a personal computing device, such as a smart phone, tablet, laptop computer, or desktop computer. But device 100 need not be so limited and may instead encompass other devices used by a user as part of processes described herein. In the illustrated example, user device 100 can include one or more user device processors 102, one or more user device interfaces 104, and user device memory 106, among other components.

The one or more user device processors 102 are one or more components of user device 100 that execute instructions, such as instructions that obtain data, process the data, and provide output based on the processing. The one or more user device processors 102 can include one or more aspects described below in relation to the one or more processors 1212 of FIG. 12.

The one or more user device interfaces 104 are one or more components of user device 100 that facilitate receiving input from and providing output to something external to user device 100. The one or more user device interfaces 104 can include one or more aspects described below in relation to the one or more interfaces 1218 of FIG. 12.

User device memory 106 is a collection of one or more components of user device 100 configured to store instructions and data for later retrieval and use. User device memory 106 can include one or more aspects described below in relation to memory 1214 of FIG. 12. As illustrated, user device memory 106 stores user device instructions 108 and other suitable user device code.

User device instructions 108 are a set of instructions that, when executed by one or more of the one or more user device processors 102, cause the one or more user device processors 102 to perform an operation described herein. In examples, instructions 108 can be those of a mobile application (e.g., that may be obtained from a mobile application store, such as the APPLE APP STORE or the GOOGLE PLAY STORE). The mobile application can provide a user interface for receiving user input from a user and acting in response thereto. User interface 104 can further provide output to the user. In some examples, client instructions 108 are instructions that cause a web browser of user device 100 to render a web page associated with a process described herein. The web page may present information to the user and be configured to receive input from the user and take actions in response thereto.

Other device 120 may be a self-service kiosk, a computer terminal, a dedicated transactions terminal—such as an electronic payment terminal, an automated customer interaction machine or device—such as an Automated Teller Machine (ATM), and the like. In some instances, the other device 120 controls access to a secure area. The other device 120 can directly control access by being configured to unlock a door responsive to an authorized user authenticating with the device 120. The other device 120 can indirectly control access to the area by indicating to another person (e.g., a security guard) that an authenticated individual should have access to the area.

In the illustrated example, other device 120 includes one or more other device processors 122, other device memory 124, and other device interface 130.

The one or more other device processors 122 are one or more components of other device 120 that execute instructions, such as instructions that obtain data, process the data, and provide output based on the processing. The one or more other device processors 122 can include one or more aspects described below in relation to the one or more processors 1212 of FIG. 12.

Other device memory 124 is a collection of one or more components of other device 120 configured to store instructions and data for later retrieval and use. Other device memory 120 can include one or more aspects described below in relation to memory 1214 of FIG. 12. Other device memory 120 can store other device instructions 126.

Other device instructions 126 are instructions that, when executed by the one or more processors 122, cause the one or more processors 122 to perform one or more operations described elsewhere herein.

The one or more other device interfaces 130 are one or more components of other device 120 that facilitate receiving input from and providing output to something external to other device 120. The one or more other device interfaces 130 can include one or more aspects described below in relation to the one or more interfaces 1218 of FIG. 12.

Server 150 is a server device that functions as part of one or more processes described herein. In the illustrated example, server 150 includes one or more server processors 152, one or more server interfaces 154, and server memory 150, among other components. In some examples, server 150 stores sufficient data to authenticate users. For instance, server 150 can be configured to receive a DID and a password and then determine whether that DID and password accurately correspond to a specific user.

The one or more server processors 152 are one or more components of server 150 that execute instructions, such as instructions that obtain data, process the data, and provide output based on the processing. The one or more server processors 152 can include one or more aspects described below in relation to the one or more processors 1212 of FIG. 12.

The one or more server interfaces 154 are one or more components of server 150 that facilitate receiving input from and providing output to something external to server 150. The one or more server interfaces 154 can include one or more aspects described below in relation to the one or more interfaces 1218 of FIG. 12.

Server memory 150 is a collection of one or more components of server 150 configured to store instructions and data for later retrieval and use. Server memory 150 can include one or more aspects described below in relation to memory 1214 of FIG. 12. Server memory 150 can store server instructions 158.

Server instructions 158 are instructions that, when executed by the one or more processors 152, cause the one or more processors 152 to perform one or more operations described elsewhere herein.

Network 190 is a set of devices that facilitate communication from a sender to a destination, such as by implementing communication protocols. Example networks 190 include local area networks, wide area networks, intranets, and the Internet.

Figure 2:
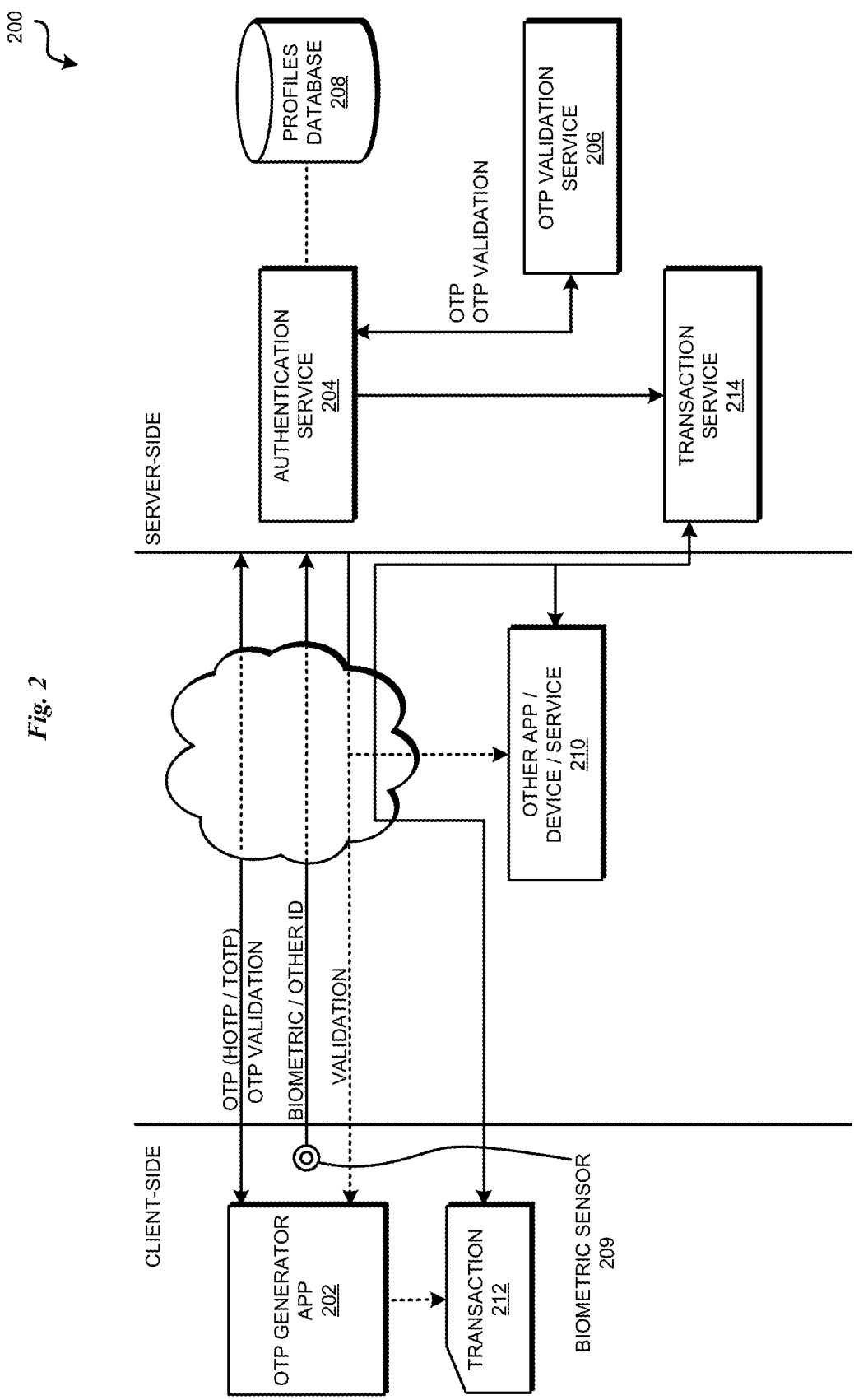
FIG. 2 depicts one example configuration for authentication with dynamic user-identifier in accordance with an illustrative embodiment.

FIG. 2 depicts one example configuration for authentication with dynamic UID in accordance with an illustrative embodiment. Authentication environment 200 is an example configuration in which secure transaction processing using DID-based authentication can be performed.

OTP generator app 202 generates a validity-period-limited OTP (e.g., a TOTP) for authentication purposes. The TOTP can be generated (and verified) according to any of a variety of standard techniques for generating TOTP, such as those described in Internet Engineering Task Force (IETF) standard RFC 6238 (for TOTP) or RFC 4226 (for HOTP (HMAC-based One-Time Passwords)). The DID can include this TOTP, which is transmitted over a network to authentication service 204 operating on the server-side of a service provider (e.g., with the server-side functionality being provided by server 150). Authentication service 204 communicates with OTP validation service 206, which assists in the validation process by confirming the authenticity of the TOTP received from OTP generator app 202.

Profile database 208 is configured to include or be queried using a customized search code such that a dynamically changing server-side identifier corresponding to the TOTP (SSDID) can be used to locate a corresponding user profile in database 208. In one embodiment, OTP validation service 206 uses the SSDID to verify and validate the TOTP, and provides the same SSDID to authentication service 204, which then uses the customized search code in conjunction with the SSDID to locate a profile of the user who sent the DID. In another embodiment, profiles database 208 is updated with current TOTP (e.g., using or based on the OTP validation service 206 for each user profile so that entries in the database can be identified based on incoming TOTP. In some examples, the profiles database 208 stores not only a current TOTP for each user profile but also one or more prior TOTP to permit a user to submit a slightly older TOTP (e.g., to address potential delays in the connection between the user device and the server and to improve the user's experience). In still further examples of this embodiments, the profiles database 208 is updated with TOTP only for those clients that are actively generating TOTPs, thereby reducing the likelihood of conflicting entries.

A user profile in database 208 includes, among other things described herein, the last or latest version of the biometric or other identity data of the user (collectively referred to as biometric data), such as a facial image of the user. In one embodiment, a user profile may not store the entire biometric data but only a set of biometric markers that are usable to uniquely identify and authenticate a given sample of biometric data. The user profiles can also store authorization information that defines what level of access a user has when properly authenticated.

Once authentication service 204 has validated the DID, authentication service 204 sends an OTP validation which is seen as a DID validation on the client-side. Upon receiving the OTP validation, biometric sensor 209, which is configured to operate with authentication environment 200 captures and sends biometric data to authentication service 204.

Authentication service 204 validates the biometric data using the stored user profile in profile database 208 that was identified using the SSDID. For instance, the received biometric data can be compared with stored biometric data. If the data match (or are within a predetermined threshold of matching), then the received data is validated. If validated, authentication service 204 sends a validation message to the client-side environment. In one embodiment, the validation message from authentication service 204 may also redirect the session to other app, device, or service 210, which would then continue the user activities in the authenticated session. If not validated, an error message can be generated and returned to the client-side environment for remediation (e.g., prompting the user to provide the biometric data again).

Once the validation message is received (e.g., in the client-side environment or at other app, device, or service 210), transaction 212 can be initiated and sent to transaction service 214 to perform the transaction. Transaction service 214 manages the transaction process and communicates with client-side environment or other app, device, service 210, as the case may be, to perform transaction 212. In some examples, the server-side provides a key or other token usable by the client-side to demonstrate authorization to proceed with the transaction.

Figure 3:
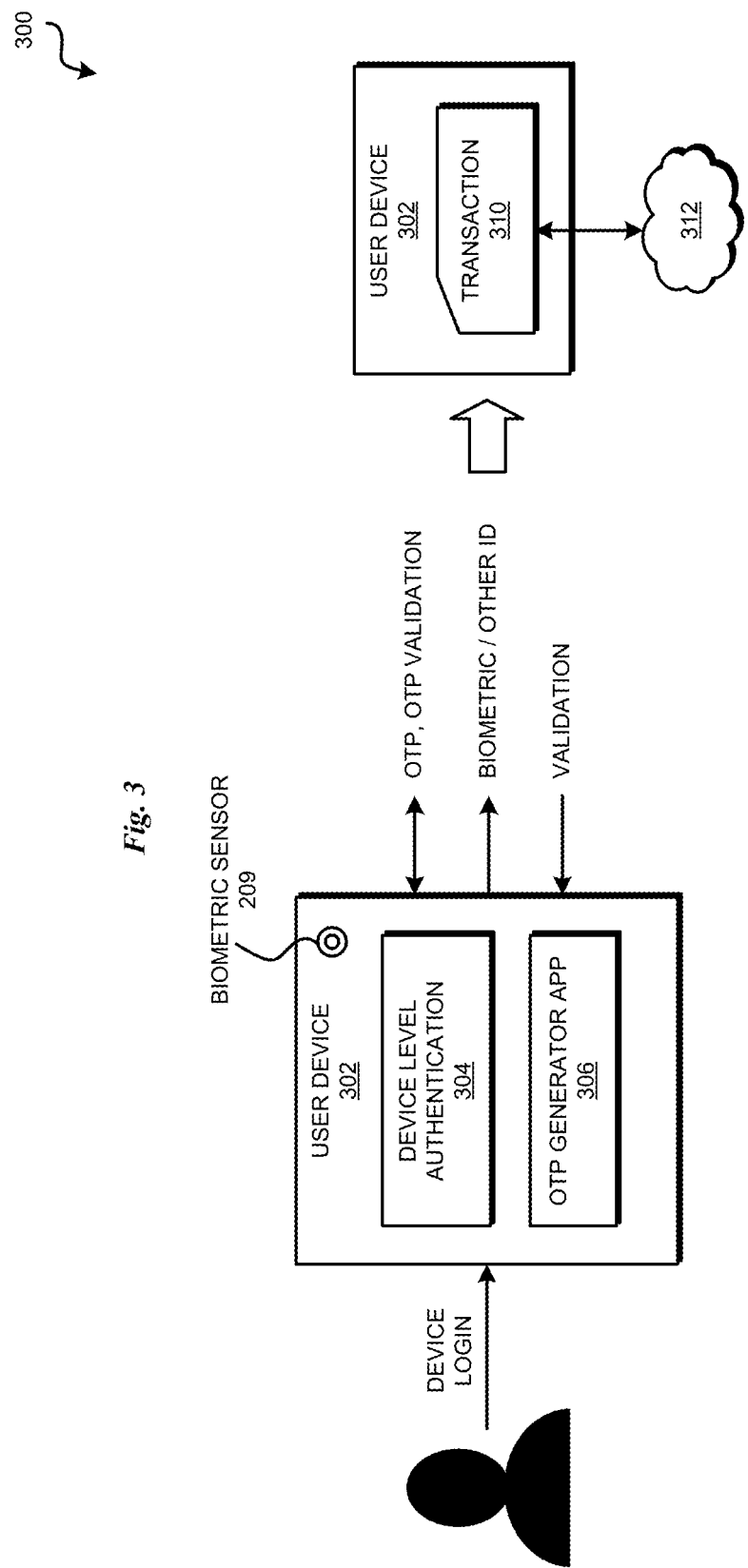
FIG. 3 depicts another example configuration for authentication with dynamic user-identifier in accordance with an illustrative embodiment.

FIG. 3 depicts another example configuration for authentication with dynamic user-identifier in accordance with an illustrative embodiment. Authentication environment 300 includes user device 302, which is equipped with device level authentication component 304 and OTP generator app 306. User device 302 is configured to receive a device login request from a user, such as over a user input component of user device 302 (e.g., a touch screen). Device level authentication component 304 performs an authentication process that may use any existing method for granting the user access to the device or a component of the device used for processes described herein (e.g., OTP generator app 306), including but not limited to biometric or other identification methods to authenticate the user. This device-level authentication adds another layer of conventional and existing security to the authentication process of the illustrative embodiments.

Once the user is authenticated on the device, OTP generator app 306 generates a TOTP that is to be used as a DID for user authentication for the service provider features and transactions. The DID is validated in the manner described with respect to FIG. 2, biometric sensor 209 captures and sends biometric data to the server-side as described with respect to FIG. 2. Upon receiving validation from the server-side in response to sending the biometric data, the operation progresses to the next stage. In the next stage, as depicted on the right-hand side of FIG. 3, user device 302 is configured to perform transaction 310 over network 312. In some instances, OTP generator app 306 is built into the operating system of user device 302.

Figure 4:
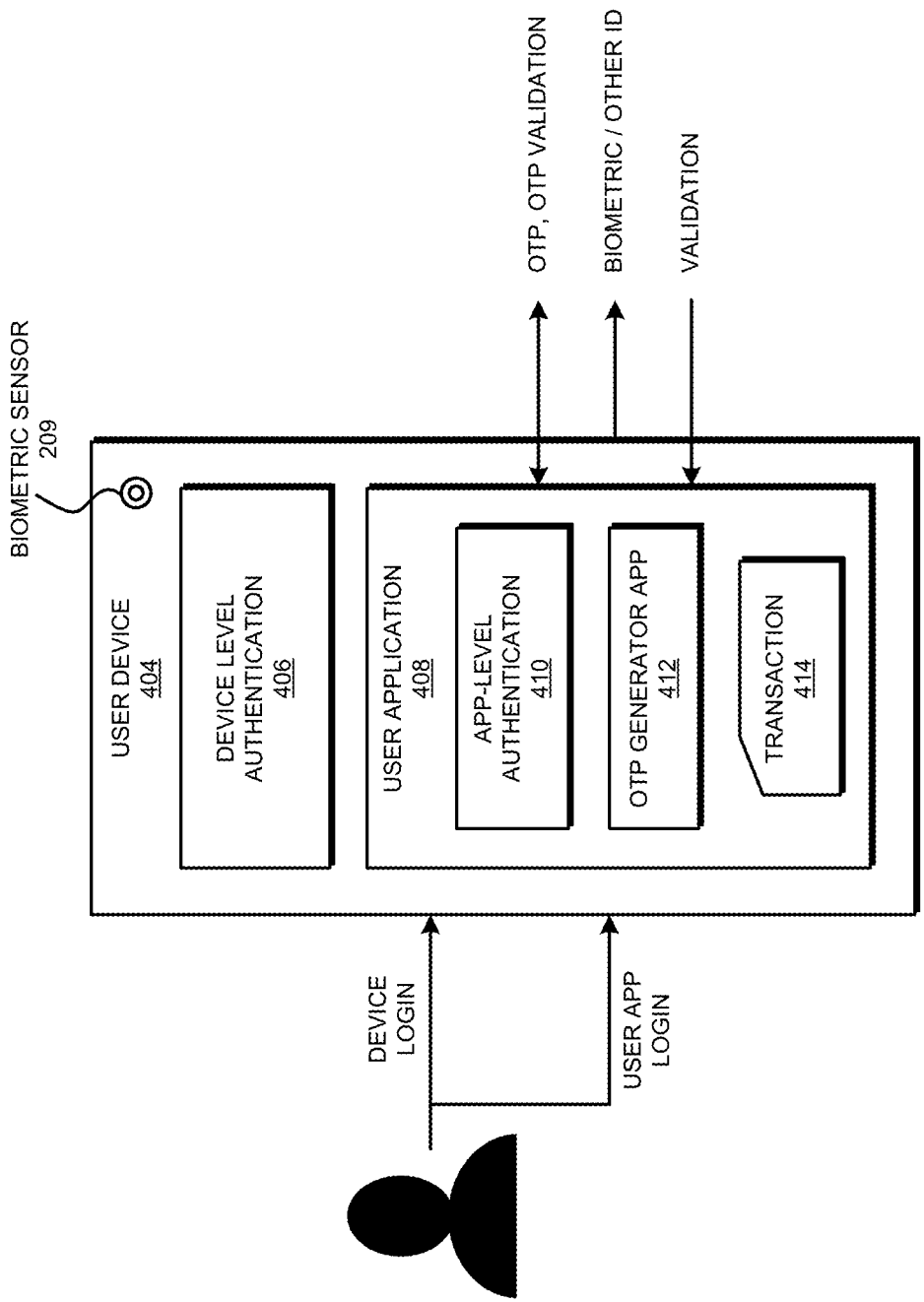
FIG. 4 depicts another example configuration for authentication with dynamic user-identifier in accordance with an illustrative embodiment.

FIG. 4 depicts another example configuration for authentication with dynamic user-identifier in accordance with an illustrative embodiment. Authentication environment 400 includes user device 404, which serves as the primary interface for the user to use a service provider's services. User device 404 incorporates device level authentication component 406, which receives device login credentials or data from the user and manages initial access control to user device 404, such as in the manner described with respect to FIG. 3.

User application 408 operates within user device 404 and provides service-provider-related functionalities to the user. App-level authentication component 410 within user application 408 receives user app login credentials or data from the user, authenticates them, and operates to ensure secure access to user application 408 itself. For instance, user application 408 can be a financial services app provided by a financial services company. The user logs into or otherwise authenticates themselves with the app (e.g., using traditional username and password techniques or using a shortcut like biometric authentication). Then the user has access to OTP generator app 412. This app-level authentication adds another layer of conventional and existing security to the authentication process of the illustrative embodiments.

OTP generator app 412 is embedded within, or is accessible from, user application 408 to produce and validate a DID as described with respect to FIG. 2. Biometric sensor 209 operates in the manner described in FIG. 2 and captures the biometric data of the user. User application 408 uses the biometric data with a server-side authentication service as described herein and obtains a validation of the biometric data to allow the user access to the features and functions of user application 408. User application 408 then performs transaction 414.

Figure 5:
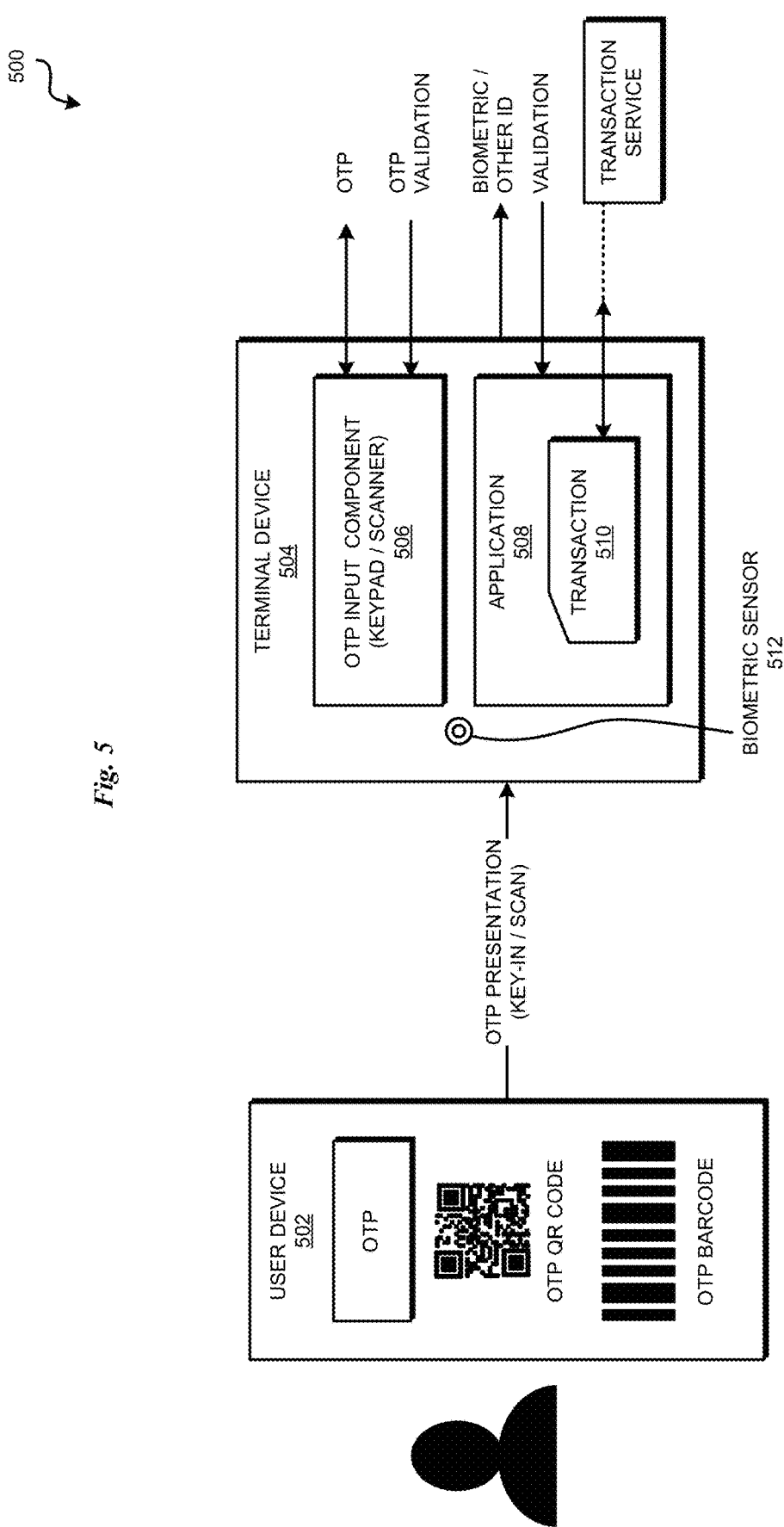
FIG. 5 depicts another example configuration for authentication with dynamic user-identifier in accordance with an illustrative embodiment.

FIG. 5 depicts another example configuration for authentication with dynamic user-identifier in accordance with an illustrative embodiment. Authentication configuration 500 includes user device 502 and terminal device 504. User device 502 generates a DID, optionally subsequent to the user performing a device login, optionally subsequent to the user performing a user-app login on user device 502, or both. The DID takes the form of an OTP, which can optionally be presented on user device 502 as an OTP QR code, an OTP barcode, or some combination thereof.

Terminal device 504 includes OTP input component 506, which is configured to receive the DID through key-in or scan methods. OTP input component 506 supports the appropriate input methods, such as a keypad for key-in entry, a suitable scanner for scanning a barcode or a QR code, or some combination thereof. OTP input component 506 accepts the DID input from the user and performs the OTP validation with a server-side authentication service in a manner described herein. An OTP generator app on user device 502 is configurable to produce the OTP in any form suitable for a particular configuration terminal device 504.

Biometric sensor 512 is integrated into, or is otherwise in data communication with terminal device 504. Biometric sensor 512 captures and sends the user's biometric data to the server-side authentication service for validation in a manner described herein. Upon successful validation response from the server-side authentication service as to both the DID and the biometric data of the user, application 508 enables the user to access the functions of application 508 and perform transaction 510, which interacts with a transaction service on the server-side, as described herein.

Figure 6:
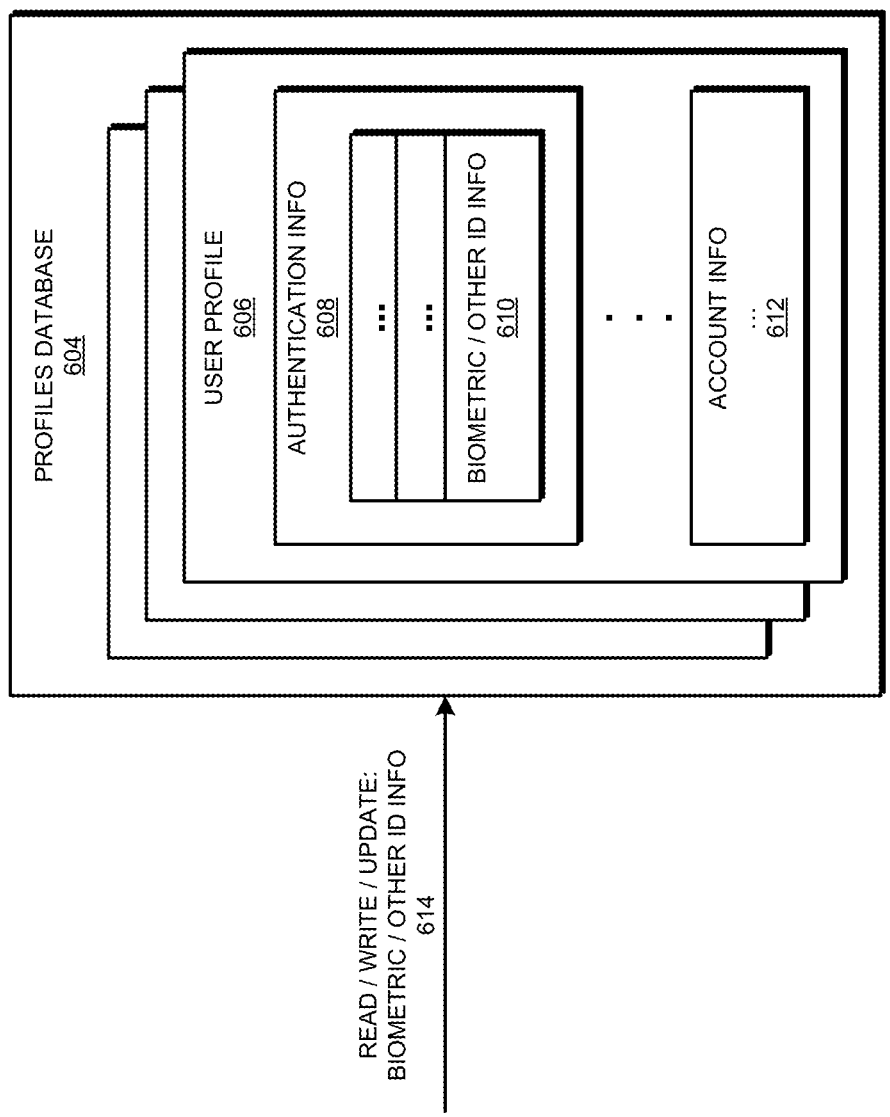
FIG. 6 depicts a portion of a server-side environment for authentication with dynamic user-identifier in accordance with an illustrative embodiment.

FIG. 6 depicts a portion of a server-side environment for authentication with dynamic user-identifier in accordance with an illustrative embodiment. Server-side environment 600 includes profiles database 604, which is configured to store one or more user profiles 606. An instance of user profile 606 corresponds to a human user and includes one or more data structures. At least some part of one or more data structures is configured to store authentication information 608 that is usable to authenticate the user in one or more ways. Authentication information 608 includes biometric or other ID information 610 to perform the user authentication in accordance with an illustrative embodiment. In one embodiment, biometric or other ID information 610 may include not the actual biometric or other ID data, but marker data usable to authenticate the biometric data received from a client-side device, or to verify the authenticity of and confirm a correspondence of the biometric data received from a client-side device with the human user.

User profile 606 can contain any number and type of other information associated with the user. As a non-limiting example, user profile 606 may include account information 612 or information usable to access account information 612 from another system.

Database operations 614 are performable on profiles database 604 by one or more systems, components, or functions in server-side environment 600. A component in server-side environment 600 may be able to perform database operations 614, which may take the form of reading, writing, updating, deleting, or otherwise managing data in profiles database 604.

Figure 7:
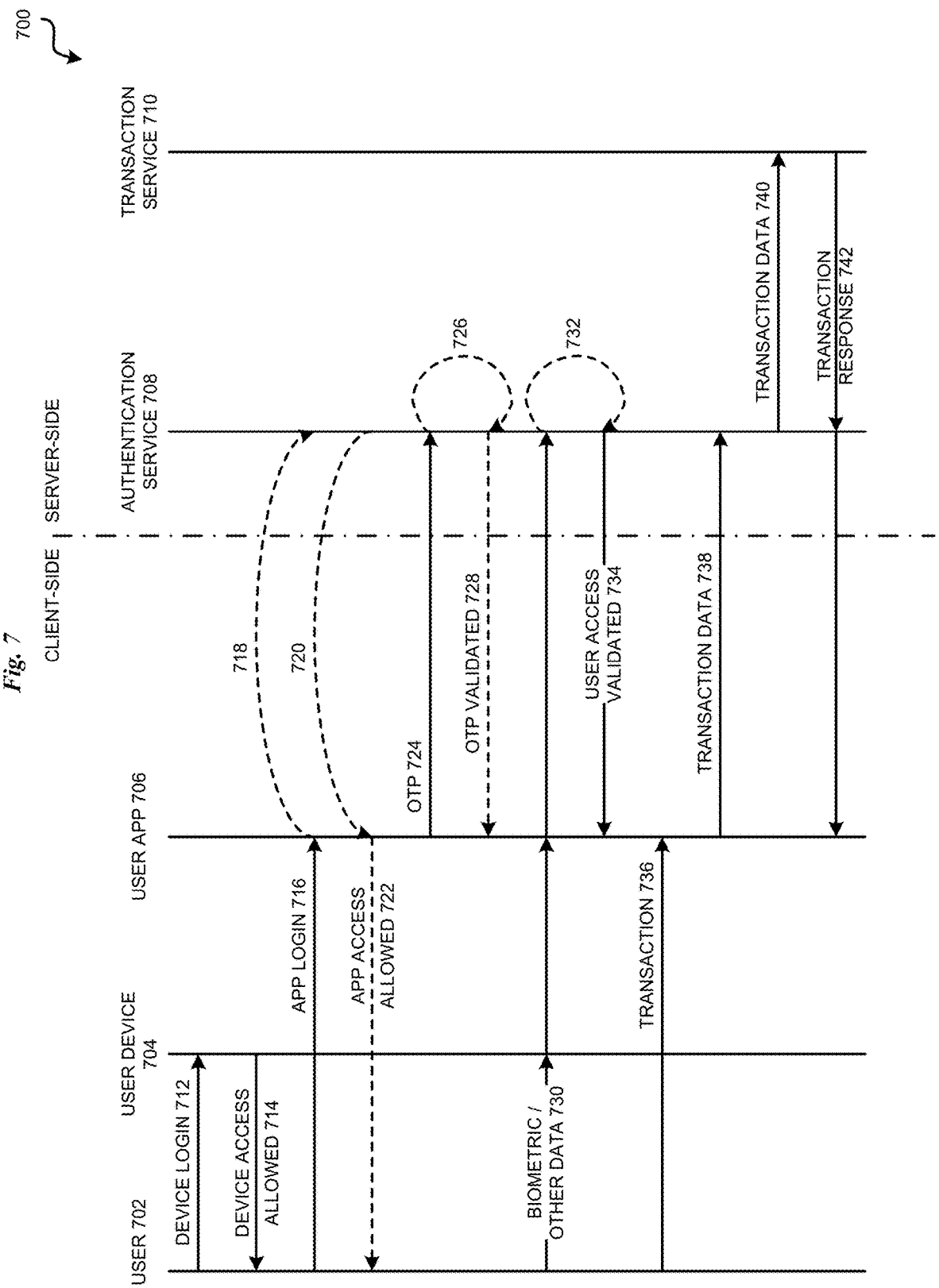
FIG. 7 depicts a sequence diagram for an example user authentication and transaction processing session in accordance with an illustrative embodiment.

FIG. 7 depicts a sequence diagram for an example user authentication and transaction processing session in accordance with an illustrative embodiment. One or more participants—user device 704 and user app 706—may be omitted in a particular configuration, as described herein. More than one device 704 and user apps 706 can also be configured to collaborate in the depicted process. Such alternative configurations will be apparent from this disclosure to those of ordinary skill in the art and the same are contemplated within the scope of the illustrative embodiments.

User 702 initiates a device login 712 on user device 704. For instance, this can include the user device 704 requesting and the user providing a password or biometric information. The user device 704 validates the provided information (e.g., by comparing it to stored values) to determine whether to authenticate the user. Upon successful authentication on user device 704 in a manner described herein, indication 714 from device 704 to user 702 indicates that the user is allowed to access the device. With access to device 704, user 702 launches user app 706 using device 704. User app 706 can also require authentication. User 702 performs app login 716 on user device 704. App authentication may be performed locally on user device 704 or by server-side authentication service 708, or by a combination thereof. In the depicted example, authentication service 708 receives request 718 from user app 706 to authenticate the user. Upon successful authentication, authentication service 708 sends response 720 to user app 706, which user app 706 optionally indicates to user 702 via message or indication 722, indicating that app access is allowed.

By a user action from user 702, or automatically without user intervention, user app 706 generates an OTP from an OTP generator that is embedded within user app 706 or is in data communication with and accessible from user app 706. User app 706 directly or indirectly transmits the OTP 724 to authentication service 708 as a DID for user 702. In some examples, the user facilitates the transmission, such as by reading the OTP from user device 704 and entering in the OTP into a device that will send the OTP to authentication service 708 or by showing a visual code encoding the OTP to a device that will send the OTP. In some instances, user device 704 plays an audio tone that encodes the OTP, and that audio tone is picked up by a device that transmits the code to authentication service 708.

Next, the OTP is validated at or by authentication service 708. This can be performed by, for example, comparing the received OTP with one or more valid or acceptable OTPs associated with user 702. The comparison can include searching profiles database 208 for a corresponding OTP. In some instances, the OTP includes both static and dynamic components. In some instances, the static component is used to easily identify the corresponding user profile and then the dynamic portion is compared with one or more valid OTPs of the user profile. If there is a match, then the OTP is successfully validated. If not, then the OTP is rejected.

Upon successful validation of the OTP at authentication service 708, such as by using a validation process 726 in a manner described herein, user app 706 receives confirmation 728 from authentication service 708 indicating that the OTP—used as a DID—has been successfully validated.

User 702 provides biometric data 730 (e.g., at or via user device 704) that is transmitted to authentication service 708. That biometric data 730 is then validated 732.

Validating 732 the biometric data 730 can include the authentication service 708 (or another remote device) comparing the received biometric data 730 with stored biometric data regarding the user. The stored biometric data can be stored in association with a user profile of the user 702 stored by the profiles database 208. The comparison can include determining whether the provided biometric data 730 is within a threshold similarity to the stored data. If so, the biometric data is validated, otherwise it is rejected.

Upon successful validation of biometric data, such as by using a server-side process 732 described herein, authentication service 708 sends indication 734 indicating that user access has been validated. This can include sending the indication 734 to user app 706, transaction service 214, or another app, device, or service 210. User 702 can now take a new action that they were unable to before they were authorized, such as initiating transaction 736 on user app 706. User app 706 sends transaction data 738 to the server-side. Transaction data 738 may or may not pass through authentication service 708 depending on the particular implementation. Eventually, transaction service 710 receives transaction data 740, which may be all or a portion of transaction 736, and may be transformed from the original form of that portion. Transaction service 710 processes transaction data 740 and sends transaction response 742 to user app 706.

Figure 8:
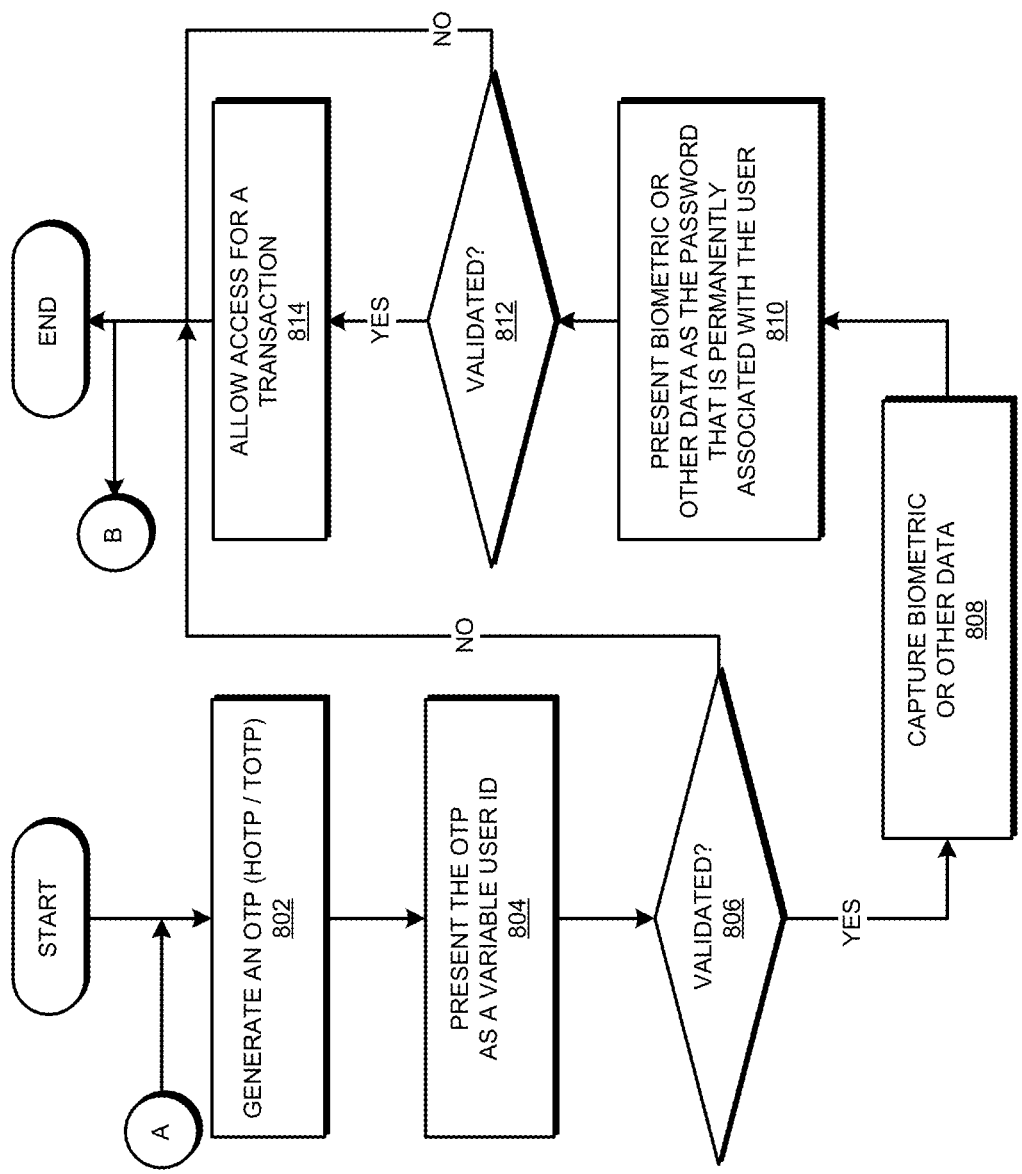
FIG. 8 depicts a process for authentication with dynamic user-identifier in accordance with an illustrative embodiment.

FIG. 8 depicts a process for authentication with dynamic user-identifier in accordance with an illustrative embodiment. Process 800 can be implemented in a user device, such as user device 702 in FIG. 7.

The process begins by generating an OTP, such as using HOTP or TOTP methods, to use the OTP (block 802). The process presents the OTP as at least a portion of a variable or dynamic UID—as a DID (block 804). The process attempts to validate the DID or checks if the DID has been validated (block 806). If the OTP is not validated ("No" path of block 806), the process ends. If the OTP is validated ("Yes" path of block 806), the process proceeds to capture the user's biometric data (block 808).

The process presents the captured biometric data as the password permanently and generally inalienably associated with the user (block 810). The process then validates the biometric data or checks if the biometric or other data is validated (block 812).

If the biometric data is validated ("Yes" path of block 812), the process allows access to the user for performing a transaction (block 814). The process ends thereafter. If the biometric data is not validated ("No" path of block 812), the process ends thereafter. Another process can enter process 800 at entry point marked (A) and exit at exit point marked (B).

Figure 9:
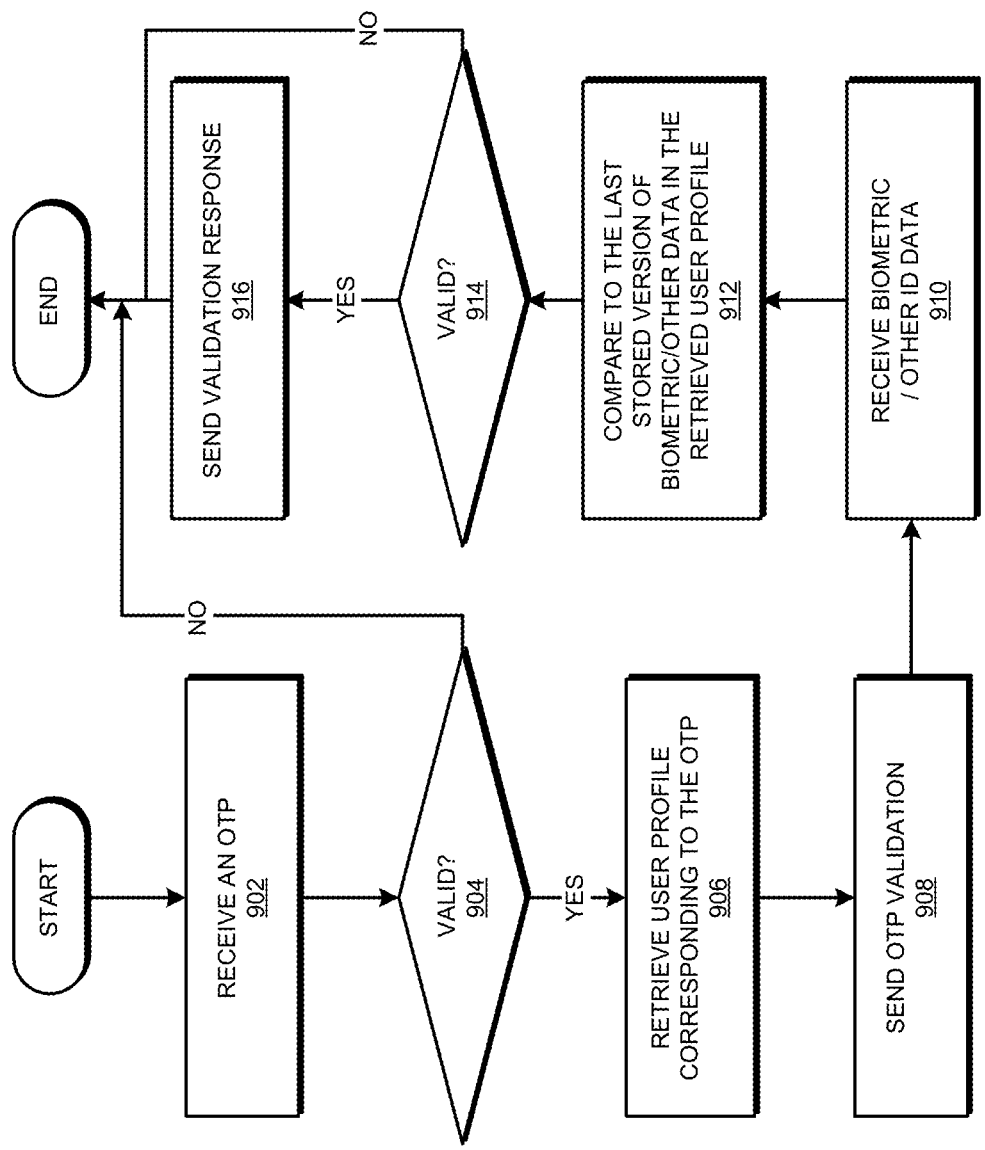
FIG. 9 depicts a flowchart of a server-side process for validating a user-identifier using authentication with dynamic user-identifier in accordance with an illustrative embodiment.

FIG. 9 depicts a flowchart of a server-side process for validating a user identity using authentication with a dynamic user-identifier in accordance with an illustrative embodiment. Process 900 can be implemented in an authentication service, such as authentication service 708 in FIG. 7.

The process begins with receiving an OTP as a DID (block 902). The process checks if the DID is valid (block 904). If the DID is valid ("Yes" path of block 904), the process retrieves the user profile corresponding to the DID, such as by using a corresponding SSDID as described herein (block 906). If the DID is not valid ("No" path of block 904), the process ends thereafter.

The process sends a confirmation that the DID has been validated (block 908). The process receives biometric data of the user (block 910). The process compares the received data using the last stored version of biometric data, or marker data therefrom, from the retrieved user profile (block 912).

The process determines whether the received biometric data is validly associated with the user whose DID was validated at block 904 (block 914). If the biometric data is validated ("Yes" path of block 914), the process sends a validation response (block 916). The validation response can be sent without receiving an entirely static UID as part of the process 900. In addition, or instead, the validation can be sent without the process receiving a password that is not based on a biometric attribute of the user. In addition, or instead, the validation can be sent without the process receiving a password that is input by a user via two or more button presses on a keyboard, keypad, touchscreen, or other human input device. The process ends thereafter.

Figure 10:
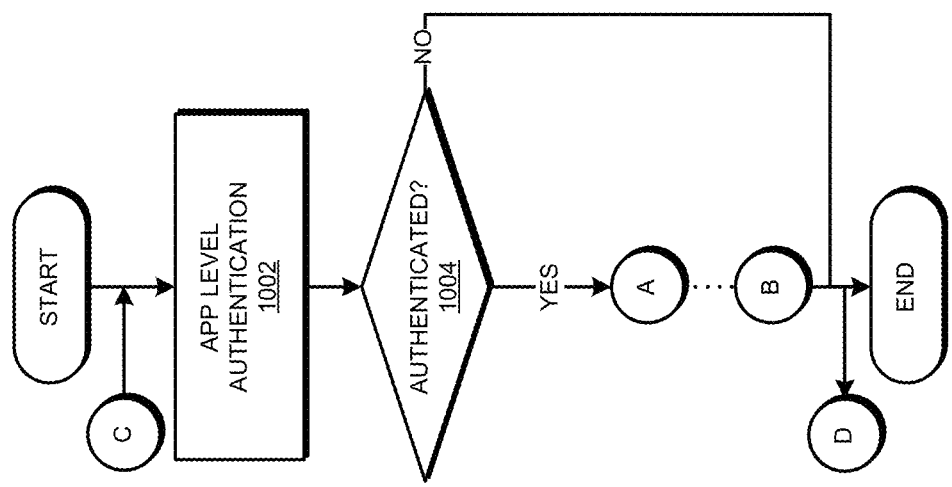
FIG. 10 depicts a flowchart for an example additional layer of authentication with authentication with dynamic user-identifier in accordance with an illustrative embodiment.

FIG. 10 depicts a flowchart for an example additional layer of authentication with authentication with dynamic user-identifier in accordance with an illustrative embodiment. Process 1000 can be implemented in a user application, such as user application 706 in FIG. 7.

The process begins by performing an app-level authentication to determine whether the user should be allowed access to the user app (block 1002). The process evaluates whether authentication is successful (block 1004). If authentication is successful ("Yes" path of block 1004), the process proceeds to process 800 of FIG. 8, enters process 800 at entry point (A), and exist process 800 at exit point (B). The process ends thereafter. If authentication is not successful ("No" path of block 1004), the process ends thereafter.

Figure 11:
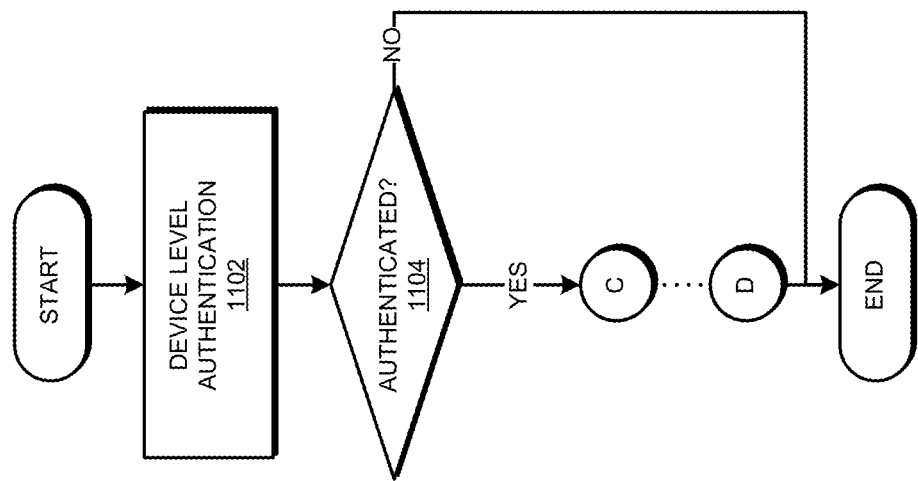
FIG. 11 depicts a flowchart for another example additional layer of authentication with authentication with dynamic user-identifier in accordance with an illustrative embodiment.

FIG. 11 depicts a flowchart for another example additional layer of authentication with authentication with dynamic user-identifier in accordance with an illustrative embodiment. The process begins by performing a device-level authentication in a manner described herein (block 1102). The process evaluates whether authentication is successful (block 1104). If authentication is successful ("Yes" path of block 1104), the process optionally proceeds to enter process 1000 of FIG. 10, entering process 1000 at entry point marked (C), and exiting process 1000 at exit point marked (D). The process ends thereafter. If authentication is not successful ("No" path of block 1104), the process terminates without proceeding further.

As discussed above, in some examples the DID includes both a dynamic and static component. In some instances, the static component is obscured or otherwise not directly knowable by the user. The implementation works as follows.

A proprietary authenticator application internally holds a static component of the DID (e.g., a system generated unique UID) and a dynamic component (e.g., generated using a shared-key based TOTP generator). The DID can be sent to or otherwise appear to the authentication server as a combination of the static and a time-based dynamic components.

The authentication server receives this time-based DID and uses the static component to locate an appropriate user record (e.g., the static portion can function as a location aspect or a locator). Then the stored TOTP key is used on the server to perform TOTP matching of the dynamic component of the DID (e.g., the dynamic aspect). In this sense no two authentication requests carry the same UID to the authentication server.

Once the prospective identity of the user is established, authentication can then proceed by matching the face scan of the user (or other biometric data) to the saved face scan done previously at the time of enrollment. An additional liveliness check can be used to ensure that a live person is being considered for authentication and a saved image or deepfake is not being used.

The obfuscation of the static component of the DID can be achieved in the proprietary authenticator application at the time of setup. For example, the authentication server during TOTP setup sends an extra server-side generated unique identifier for the user. This unique identifier is static for the user and follows public key infrastructure concepts. A server holding a public-private keypair encrypts the unique identifier with the public key, and send the encrypted result to the authenticator app. The authenticator app can lack sufficient keys or permission to decrypt the encrypted package to determine the underlying identifier. That way the client side never finds out what this static unique identifier is. But the authentication app can save this encrypted package containing the user identifier and send back the package as-is to the authentication server during each authentication request along with the dynamic TOTP generated by the authenticator app. For instance, the DID can include both the dynamic (TOTP) and static (encrypted package) aspects. In addition, or instead, the static and dynamic components can be sent separately.

An example method can include the following steps.

A customer establishes relation with an entity to authenticate with (e.g., a bank). This can be performed through any of a number of traditional channels, such as applying for and receiving access or a product that the entity offers. This can be managed at a physical location (e.g., a branch) or virtually (e.g., online via a website or app associated with the entity).

During the customer's onboarding process, an electronic record (account) is created for the user in bank electronic systems that holds their personal information (e.g., name, address, and product information). The customer also creates login credentials. This can involve the customer installing an authenticator on their phone or other mobile device. The authenticator can be a general purpose TOTP authenticator or a special purpose TOTP authenticator configured to facilitate the transmission of a UID having both static and dynamic components. An authentication server used here can have a standard public/private key pair already secured safely on its storage.

In an example, a basic validation is performed, which involves sending an OTP to the registered cell phone number or email of the customer as a step in establishing credentials. Once the customer authenticates with this OTP, a standard 128-bit or higher shared key is generated by the authentication server that is stored with the user record on the server and is also passed to the authenticator running on the user's device. The authenticator stores this shared key securely (e.g., in a SECURE ENCLAVE of an APPLE device or other dedicated security chip or coprocessor). The authenticator app then generates a TOTP using this shared key and the TOTP is sent back to the server. The server performs a standard TOTP validation, and it completes the TOTP portion (dynamic part) of the setup.

The server then generates or obtains a unique user identifier (e.g., the static component), encrypts it with the associated public key (as mentioned above), saves it with the user record on the server, and sends the encrypted package to the authenticator app.

The authenticator app just saves this encrypted package in app storage on the user device. This encrypted packet holds the static user identifier. In some embodiments, the packet is encrypted such that the packet cannot be readily decrypted or readily opened in the authenticator app (e.g., because authenticator does not have the private key) and as such neither the authenticator app nor the user is able to readily discern the content of the encrypted package.

A face or other biometric scan (e.g., with or without liveliness check) is performed and sent to the authentication server and the biometric record is saved with the user record for future authentications.

Then in an example method for using the authenticator, the following process can be performed. When the user is prompted to authenticate, the user can open the proprietary authenticator (e.g., which may be part of an app associated with the entity). The proprietary authenticator can continuously generate dynamic codes using TOTP principles. The code can be encoded in a QR code, an audio code or another format for ease of transmission. The content of the code can be the encrypted user identifier and the dynamic TOTP token. A prompting device (e.g., an automated teller machine) can scan or otherwise receive the code generated by the authenticator and transmits it to a server. The server then decrypts the static component with a private key and uses the static component to identify a user record. The server then uses the dynamic component (e.g., the TOTP token) for a match with a dynamic component associated with a user record. If this succeeds, the server can send a request or instructions that cause the user to provide biometrics, such as via their phone or the prompting device. The user device or the prompting device (e.g., via an inbuilt camera at the facility) can then capture a new face image or other biometric data and then send this biometric data to the server for a facial match. Once the biometric data matches the saved record, access is granted to the facility or resource.

In yet another example, there is a technique for generating a DID by using a numeric static component and TOTP as a dynamic component. This approach is a modification of the above technique. In particular, rather than generating a hidden static component, a numeric static component is generated for the user which-when combined with a TOTP token-will serve as the DID. Though the static component is not hidden, the numeric nature of this implementation makes it a beneficial implementation for those instances where numeric identifiers are useful (e.g., credit and debit card numbers).

In an example implementation, an issuer will provide users a DID that has a static component (e.g., a certain numeric code) and a dynamic component (e.g., a TOTP based code) that will be added as a suffix or prefix to the static component. The overall combination provides the user with an overall dynamic identifier for authentication or other purposes. The following example shows a 15-digit DID with 9-digit static component and a 6-digit dynamic component: [123456789]{012345}, where the portion in the square brackets is static and the portion in the curly brackets is dynamically generated. This technique may be implemented in the following manner.

As with the prior technique, proprietary authenticator application internally holds a static component of the DID (e.g., a system generated unique UID) and a dynamic component (e.g., generated using a shared-key based TOTP generator). The DID can be sent to or otherwise appear to the authentication server as a combination of the static and a time-based dynamic components.

Then, as above, the authentication server receives this time-based DID and uses the static component to locate an appropriate user record (e.g., the static portion can function as a location aspect or a locator). Then the stored TOTP key is used on the server to perform TOTP matching of the dynamic component of the DID (e.g., the dynamic aspect). In this sense no two authentication requests carry the same UID to the authentication server.

Again, once the prospective identity of the user is established, authentication can then proceed by matching the face scan of the user (or other biometric data) to the saved face scan done previously at the time of enrollment. An additional liveness check can be used to ensure that a live person is being considered for authentication and a saved image or deepfake is not being used.

However, unlike the prior technique, here the static component need not be obfuscated at the time of setup.

The enrollment for this technique can be similar to the above-described technique.

The following steps can happen when the user tries this authentication system to access a secure asset or facility (ATM or brick-and-mortar entity like a safe deposit box) or attempts to use the authentication to make a transaction.

The user opens the proprietary authenticator, which continuously generates a code that is a combination of a static code and a TOTP dynamic code. For instance, the authenticator can generate a 15-digit numeric code that is a combination of the 9-digit numeric static code and the 6-digit dynamic TOTP code. This code can be displayed as a QR code. The user can either manually enter the 15-digit numeric code at a querying terminal (e.g., ATM machine) or scan the QR code using the querying terminal (e.g., a facility access point). The user will then have the time limit (usually 30 seconds) of the TOTP to finish the authentication process.

The querying terminal sends the provided code to a server, which then uses the static numeric component of the user id to locate the user record. The server then uses the TOTP token (dynamic component) for a TOTP match on the server with the located user record. If this succeeds, instructions will be provided to the user for a facial scan with liveness.

The camera or other biometric device at the facility or querying terminal then captures a new face image with liveness check and then send this face capture to the server for a facial match. In some examples, the biometric scan is contemporaneous with transmitting or receiving the code.

The querying device transmits the captured biometric information to the server. The server then compares the received biometric information with the stored biometric information to determine whether there is a match. If so, the server sends a confirmation message to the querying device, which indicates that the present user is authenticated. In some instances, the querying device also transmits to the server indication of the level of access being requested. The server can then compare the level of access requested with the level of access granted to the user based on information in the user record. If the user is permitted the requested level of access, then the server can respond accordingly, so the querying device can grant access. Otherwise, entry can be denied notwithstanding authenticating the user.

An important benefit of this technique is that this system can be used as an authorization mechanism for existing transaction networks (e.g., debit or credit transaction networks) that rely on numeric codes. Thus, resource intensive retrofitting need not be performed. For instance, there can be a model where the techniques described above can be used to generate more secure credit card numbers, which can be used for transactions. For example, a code may look like the following: [2 bank code digits][2 special code digits][9 DID static component digits][6 DID dynamic component digits][1 dynamic Luhn Check digit].

This results in a 20-digit card number where the 9 digit DID dynamic component and the Luhn digit change periodically (e.g., every 30 seconds). The biometric authentication can serve as the PIN or other validator for the associated card.

The workflow for this use case can involve modeling the requirements for the payment network, acquiring bank, the issuing bank, and the merchant. Additionally, the system can ensure that point of sale terminals, websites, and mobile channels use cameras or other biometric authenticators to scan the user's face and send to the authentication server alongside the 20-digit "one-time" credit card number. That 20-digit number can then be associated with the user's record using techniques described above to ensure the user is properly charged for the associated transaction.

Figure 12:
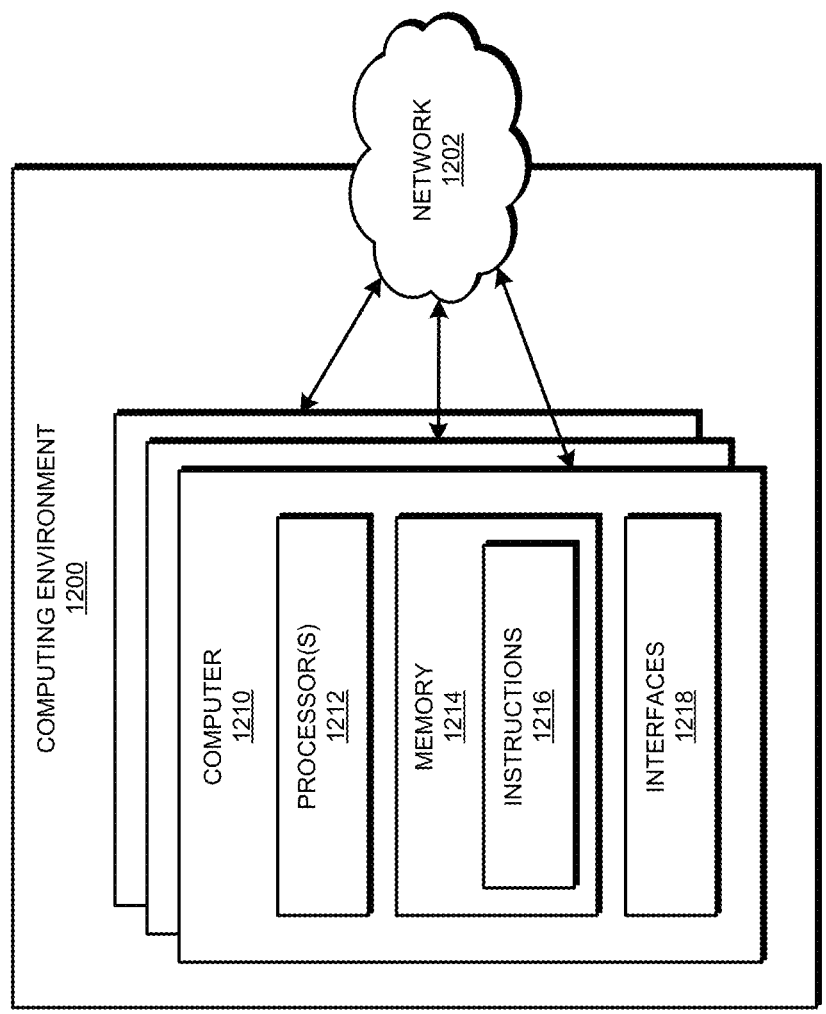
FIG. 12 depicts a data processing environment 20 in which aspects of the present disclosure may be implemented.

FIG. 12 depicts a data processing environment 20 in which aspects of the present disclosure may be implemented. Computing environment 1200 is a set of one or more virtual or physical computers 1210 that individually or in cooperation achieve tasks, such as implementing one or more aspects described herein. Computers 1210 have components that cooperate to cause output based on input. Example computers 1210 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, computing environment 1200 includes at least one physical computer.

Computing environment 1200 may specifically be used to implement one or more aspects described herein. In some examples, one or more of computers 1210 may be implemented as a user device, such as mobile device and others of computers 1210 may be used to implement aspects of a machine learning framework useable to train and deploy models exposed to the mobile device or provide other functionality, such as through exposed application programming interfaces.

Computing environment 1200 can be arranged in any of a variety of ways. Computers 1210 can be local to or remote from other computers 1210 of environment 1200. Computing environment 1200 can include computers 1210 arranged according to client-server models, peer-to-peer models, edge computing models, other models, or combinations thereof.

In many examples, computers 1210 are communicatively coupled with devices internal or external to computing environment 1200 via network 1202. Network 1202 is a set of devices that facilitate communication from a sender to a destination, such as by implementing communication protocols. Example networks 1202 include local area networks, wide area networks, intranets, or the Internet.

In some implementations, computers 1210 can be general-purpose computing devices (e.g., consumer computing devices). In some instances, via hardware or software configuration, computers 1210 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 1210 include one or more processors 1212, memory 1214, and one or more interfaces 1218. Such components can be virtual, physical, or combinations thereof.

The one or more processors 1212 are components that execute instructions, such as instructions that obtain data, process the data, and provide output based on the processing. The one or more processors 1212 often obtain instructions and data stored in memory 1214. The one or more processors 1212 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 1212 include at least one physical processor implemented as an electrical circuit. Example providers of processors 1212 include INTEL, AMD, QUALCOMM, TEXAS INSTRUMENTS, and APPLE.

Memory 1214 is a collection of components configured to store instructions 1216 and data for later retrieval and use. Instructions 1216 can, when executed by the one or more processors 1212, cause execution of one or more operations that implement aspects described herein. In many examples, memory 1214 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 1214 can store information encoded in transient signals.

The one or more interfaces 1218 are components that facilitate receiving input from and providing output to something external to computer 1210, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 1218 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 1218 can facilitate connection of computing environment 1200 to network 1290.

Computers 1210 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

In addition to the depicted components of system 10 in FIG. 1, system 10 can also include many other components including, but not limited to—a public cloud, a private cloud, a gateway, a cloud orchestration module, a computer (which may further include specialized processing circuitry, cache, a communication fabric, a volatile memory, a persistent storage including an operating system, and peripheral devices), Internet of Things (IoT) sensors, a remote database, and a container set.

A device contemplated herein may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database. As is well understood in the art of computer technology, and depending upon the technology, performance of a computer-implemented method may be distributed among multiple computers and/or between multiple locations. Where the detailed discussion in this disclosure is focused on a single computer, such focus is only to keep the presentation as simple as possible. A computer or device contemplated herein may be located in or participate in a cloud, even though it is not shown in a cloud. On the other hand, a computer or device is not required to participate in a cloud except to any extent as may be affirmatively indicated.

A processor device described herein may be of any type now known or to be developed in the future, may be distributed over multiple packages or coordinated integrated circuit chips, and may implement multiple processor threads and/or multiple processor cores. Cache memory may be located in the processor chip package(s) and is typically used for data or code that should be available for rapid access by the threads or cores running on a processor. Cache memories are typically organized into multiple levels depending upon relative proximity to the processing circuitry. Alternatively, some, or all, of the cache for the processor set may be located "off chip." In some computing environments, a processor may be designed for working with qubits and performing quantum computing.

Computer readable program instructions are typically loaded onto a computing device to cause a series of operational steps to be performed by a processor set of the computing device and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache, and the other storage media discussed below. The program instructions, and associated data, are accessed by the processor set to control and direct performance of the inventive methods. At least some of the instructions for performing the inventive methods may be stored in a persistent storage.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the embodiments. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment, either locally at a data processing system or over a data network, within the scope of the illustrative embodiments. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment within the scope of the illustrative embodiments. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Although many examples herein are described in the context of an authentication system for hard facilities or resources (e.g., ATMs, safe deposit boxes, or vault facilities). Techniques described herein can be applied in other contexts. For instance, techniques can be used to eliminate the need for a physical card to access an ATM. Such access can be provided without the need for a card number or PIN, which reduces an attack surface (e.g., mitigating skimming attacks by permitting authentication without the user needing to provide something that could be skimmed). In another use case, techniques described herein can be used as an authorization grantor for payments (e.g., credit or debit card payments). Techniques described herein can be used to generate a new payment number for every transaction. The workflow for this use case can involve modeling the requirements for the payment network, acquiring bank, the issuing bank, and the merchant. Disclosed authentication mechanisms can bring the safety of a biometric validation with intrinsic two-factor authentication and address the need for issuing cards for ATM, debit and credit use cases.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (Saas) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments each have been described by stating their individual advantages, respectively, present application is not limited to a particular combination thereof. To the contrary, such embodiments may also be combined in any way and number according to the intended deployment of present embodiments without losing their beneficial effects.

Techniques herein may be applicable to improving technological processes of a financial institution, such as technological aspects of transactions (e.g., resisting fraud, entering into loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method, comprising:
   receiving, from a device, at an authentication service, a dynamic user identifier comprising a one-time password in an authentication message constructed to carry the dynamic user identifier in place of a pre-determined user identifier of a user;
   locating in a profiles database, using a customized search query with a code based on the dynamic user identifier, a user profile, wherein the dynamic user identifier includes a static portion and a dynamic portion, and wherein the static portion is used to facilitate the locating of the user profile;
   receiving at the authentication service, a secondary identification data of the user, wherein the secondary identification data comprises a biometric information captured from the user;
   validating the biometric information using the user profile;
   enabling, responsive to the validating of the biometric information being successful, the device to perform an operation for the user, wherein the enabling is not based on the authentication service validating an entirely static user identifier and is not based on the authentication service validating a manually typed password.

2. The computer-implemented method of claim 1, further comprising:
   authenticating the user, at the device, using a device-level authentication credential, wherein the authentication message is received responsive to a successful device-level authentication.

3. The computer-implemented method of claim 1, further comprising:
   authenticating the user, at the device, using an application-level authentication credential, wherein the authentication message is received responsive to a successful application-level authentication.

4. The computer-implemented method of claim 3, wherein the application-level authentication is performed responsive to a device-level authentication being successful.

5. The computer-implemented method of claim 1, further comprising:
   generating the OTP, by sending an instruction to a one-time password generator application, responsive to a user input at a user interface of the device, wherein the one-time password is a time-limited one-time password.

6. The computer-implemented method of claim 5, wherein the device is a user device associated with the user, and the one-time password generator application is accessible from within an other application.

7. The computer-implemented method of claim 6, wherein the other application is a service provider application and permits access to the one-time password generator application subsequent to a successful application-level authentication.

8. The computer-implemented method of claim 1, wherein the device is a terminal device of a service provider, and wherein the terminal device is configured with an interface to receive an input from the user, the input containing the one-time password.

9. The computer-implemented method of claim 8, wherein the one-time password is encoded within a scannable encoded image, wherein the interface comprises a scanner, and wherein the input comprises presenting the scannable code at a scanner.

10. The computer-implemented method of claim 1, wherein the transmitting the secondary identification data is responsive to a successful validation of the one-time password, and wherein the biometric information is captured after the transmitting of the one-time password.

11. The computer-implemented method of claim 1, wherein the receiving the one-time password and the receiving the secondary identification data occurs in a single received message, the single received message comprising the authentication message.

12. The computer-implemented method of claim 1, further comprising:
locating in the user profile a previous version of the biometric information captured at a previous session with a service associated with the authentication service, wherein the validating the biometric information comprises using the previous version of the biometric information to validate the biometric information.

13. The computer-implemented method of claim 12, further comprising:
replacing the previous version of the biometric information with the biometric information.

14. The computer-implemented method of claim 1, further comprising:
locating in the user profile marker data corresponding to a version of the biometric information, wherein the validating the biometric information comprises using the marker data to validate the biometric information.

15. The computer-implemented method of claim 1, further comprising:
capturing the biometric information using a biometric sensor coupled with the device, wherein the biometric information comprises a facial scan of the user;
performing a liveliness check on the facial scan; and
rejecting the facial scan responsive to the facial scan corresponding to a facsimile of the user.

16. A computer program product comprising one or more non-transitory computer readable storage media, and program instructions collectively stored on the one or more non-transitory computer readable storage media, the program instructions executable by a set of one or more processors to cause the set of one or more processors to perform operations comprising:
receiving, from a device, at an authentication service, a dynamic user identifier comprising a one-time password in an authentication message constructed to carry the dynamic user identifier in place of a pre-determined user identifier of a user;
locating in a profiles database, using a customized search query with a code based on the dynamic user identifier, a user profile, wherein the dynamic user identifier includes a static portion and a dynamic portion, and wherein the static portion is used to facilitate the locating of the user profile;
receiving at the authentication service, a secondary identification data of the user, wherein the secondary identification data comprises a biometric information captured from the user;
validating the biometric information using the user profile;
enabling, responsive to the validating of the biometric information being successful, the device to perform an operation for the user, wherein the enabling is not based on the authentication service validating an entirely static user identifier and is not based on the authentication service validating a manually typed password.

17. The computer program product of claim 16, wherein the stored program instructions are stored in a computer readable storage device in a data processing system, and wherein the stored program instructions are transferred over a network from a remote data processing system.

18. The computer program product of claim 16, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

19. A computer system comprising a set of one or more processors and one or more non-transitory computer readable storage media, and program instructions collectively stored on the one or more non-transitory computer readable storage media, the program instructions executable by the set of one or more processors to cause the processor to perform operations comprising:
receiving, from a device, at an authentication service, a dynamic user identifier comprising a one-time password in an authentication message constructed to carry the dynamic user identifier in place of a pre-determined user identifier of a user;
locating in a profiles database, using a customized search query with a code based on the dynamic user identifier, a user profile, wherein the dynamic user identifier includes a static portion and a dynamic portion, and wherein the static portion is used to facilitate the locating of the user profile;
receiving at the authentication service, a secondary identification data of the user, wherein the secondary identification data comprises a biometric information captured from the user;
validating the biometric information using the user profile;
enabling, responsive to the validating of the biometric information being successful, the device to perform an operation for the user, wherein the enabling is not based on the authentication service validating an entirely static user identifier and is not based on the authentication service validating a manually typed password.

* * * * *